E. TUELL.
DRAIN VALVE FOR PUMPS.
APPLICATION FILED JULY 18, 1912.
1,057,100.
Patented Mar. 25, 1913.
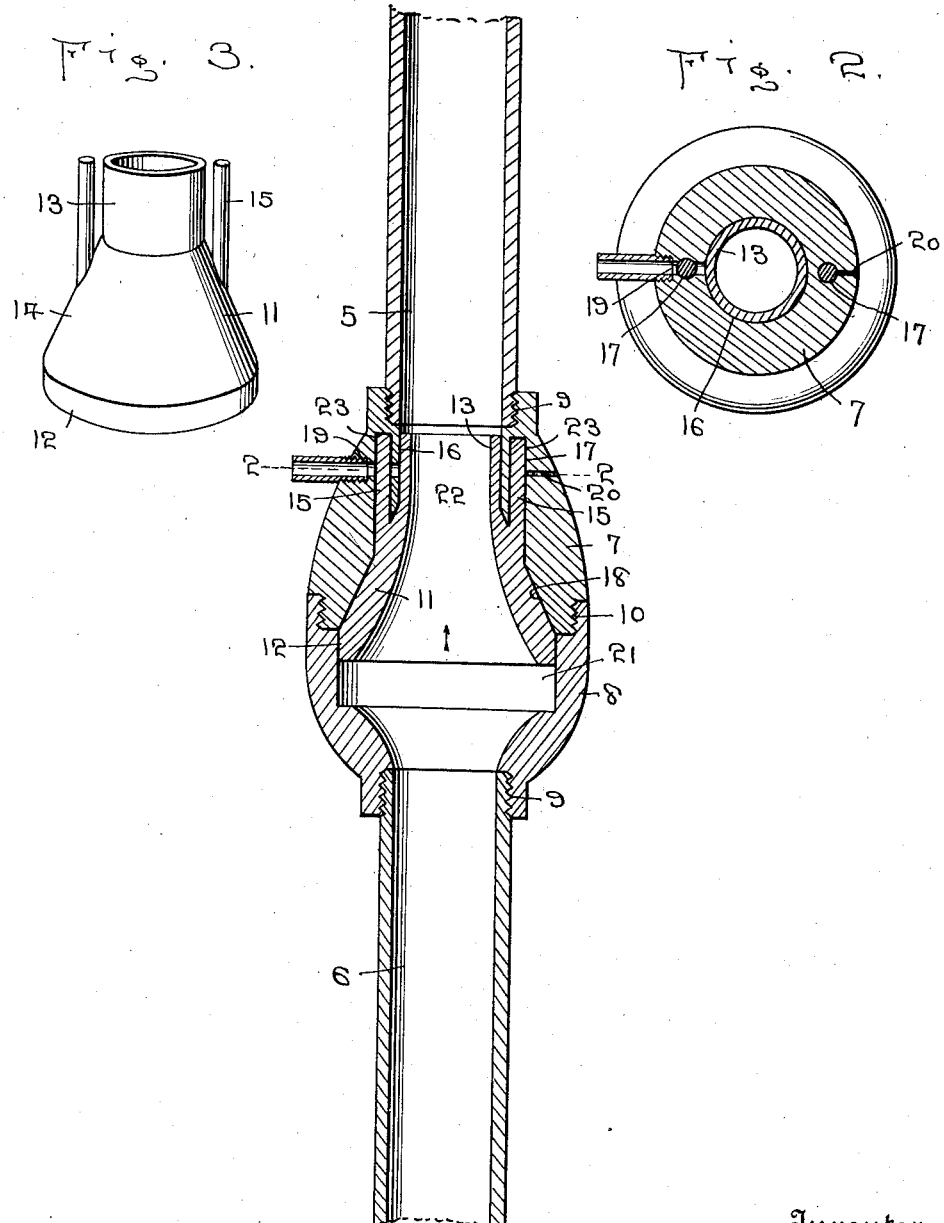
Witnesses
Thos. W. Riley
M. Newcomb
Inventor
E. Tuell
By W J FitzGerald
Attorneys

UNITED STATES PATENT OFFICE.

ELMER TUELL, OF TRIBUNE, KANSAS.

DRAIN-VALVE FOR PUMPS.

1,057,100.  Specification of Letters Patent.  Patented Mar. 25, 1913.

Application filed July 18, 1912. Serial No. 710,211.

*To all whom it may concern:*

Be it known that I, ELMER TUELL, a citizen of the United States, residing at Tribune, in the county of Greeley and State of Kansas, have invented certain new and useful Improvements in Drain-Valves for Pumps; and I do hereby declare the following to be a full, clear, and exact description of the invention, such as will enable others skilled in the art to which it appertains to make and use the same.

This invention relates to valves, and it more particularly relates to improved drain valves for pumps.

An object of the invention is to provide an improved drain valve which may be attached to the liquid conveying pipe of any liquid pump.

Another object of the invention is to provide an improved valve of this character which is entirely automatic in operation.

Another object of the invention is to provide a device of this character with air cushioning elements.

A further object is to generally improve and simplify devices of this character.

Other objects and advantages may be recited hereinafter and in the claims.

In the accompanying drawings which form a part of this application, Figure 1 is a vertical sectional view through adjacent pump pipe sections and through my improved drain valve mechanism. Fig. 2 is a horizontal section taken on the line 2—2 of Fig. 1, and, Fig. 3 is a detail perspective view of the valve member or closure.

Referring to the drawings in which similar reference characters designate corresponding parts throughout the several views, an upper pipe section is represented by the numeral 5, and a lower pipe section is designated 6. The upper pipe section is adapted to be connected with a pump of any desired character (not shown), while the lower pipe section is adapted to communicate with any source of liquid supply (not shown).

To the upper pipe section 5 is secured the upper section 7 of the drain valve body, the lower section 8 of the drain valve body being secured to the lower pipe section 6. The valve body sections may be secured to the pipe sections by any proper means, screw threads 9 being shown in the present instance. The valve body sections 7 and 8 are preferably united by means of screw threads 10.

The valve closure 11 is preferably in the form of an inverted funnel, its lower portion 12 being cylindrical, its upper portion 13 being cylindrical, and its intermediate portion 14 being frusto-conical. The valve member 11 may be formed with guide arms 15, although these guide arms are not absolutely essential.

The upper body member 7 is provided with a cylindrical bore 16 and with cylindrical bores 17, the latter being disposed on opposite radii of the cylindrical bore 16. This member 7 is also provided with a conical bore 18 and with lateral openings or apertures 19 and 20. The lower member 8 is provided with a cylindrical bore 21, in which the cylindrical portion 12 is slidably seated, the upper cylindrical portion 13 being slidably seated in the cylindrical bore 16, while the guide arms 15 are slidably seated in the bores 17. It will be seen, therefore, that the conical portion of the valve closure 11 is adapted to be seated in the conical bore 18. The bores 17 communicate with the openings 19 and 20 respectively, while the aperture 19 also communicates with the cylindrical bore 16.

It will be seen that the interior portion 22 of the valve closure is less capacious than the pipe sections 5 and 6, so that when water is forced up through the valve closure, said closure is lifted thereby, into the position shown in Fig. 1. However, when the pumping ceases, so that the upward pressure against the valve closure ceases, said valve closure moves downward, by gravity, so that the apertures 19 and 20 are open, thereby admitting air into the bores 17 and 16, so that water may pass out through the aperture 19.

It will be understood, that this drain valve is to be placed at some convenient point so that it and the lower pipe section are out of the freezing zone; the purpose of the mechanism being to drain the upper pipe section, which is assumed to be partly or wholly in the freezing zone.

The bores 17 are extended above the apertures 19 and 20, as indicated at 23, so that when air enters through the apertures 19 and 20 it also enters into the upper extensions or air chambers 23 of the bores 17. The purpose of these air chambers 23 is as follows:—When an operator begins to pump, the valve closure rises suddenly, and tends to strike the valve seat or conical bore 18 with a sharp blow, which would be likely to cause the valve closure to stick in the seat 18, and not fall by gravity when the pumping ceases; but instead, the guide arms or plungers 15 are arrested by the air in the air chamber 23, and as the pumping operation is continued, the air is gradually forced out around the sides of the plungers 15, and the valve closure is gradually settled in the seat 18. When the pumping operation ceases, after the valve is seated, the plungers 15 are retained, for a short interval, in the air chambers 23, by suction, so that a temporary cessation of pumping will not cause or allow the drain aperture 19 to be opened; but, after the pumping operation has ceased for a sufficiently long interval of time, the weight of the valve closure withdraws the plungers from the air chambers 23, while air gradually enters said air chambers around the sides of the plungers.

It will be seen that I have provided a drain valve of this character which is fully capable of attaining the foregoing objects, and in a thoroughly practical and efficient manner.

I do not limit my invention to the exact details of construction, combination and arrangement of parts as illustrated and described herewith, but my invention may only be limited by a reasonable interpretation of the claims.

What I claim is:

1. In a drain valve, a hollow body having a conical valve seat converging upwardly and having a drain aperture above the valve seat, water conveying pipe connected with the hollow body, a conical valve closure within the hollow body and adapted to be seated by the pressure of water flowing therethrough and to be unseated by gravity, and means carried by the valve closure for alternately opening and closing the drain aperture.

2. In a drain valve, a hollow body having a valve seat therein and having a drain aperture above the valve seat and having a cylindrical bore communicating with the drain aperture and extending thereabove, and a valve closure within the hollow body and having a plunger extending into the cylindrical bore and extending into the portion of the cylindrical bore above the drain aperture, for the purpose specified.

3. In a drain valve, a hollow body adapted to be connected to the adjacent ends of liquid conveying pipe sections and having a valve seat therein, a hollow valve closure in the hollow body through which liquid may flow from one pipe section to the other said pipe section, the liquid conveying capacity of the valve closure being less than that of the pipe sections so that when liquid passes through the valve closure it applies a pressure for seating the valve closure, said valve closure being adapted to be unseated by gravity, said hollow body having a drain aperture therein which is opened when the valve closure is unseated and closed when the valve closure is seated.

4. In a drain valve, a hollow body having a conical valve seat therein and having a drain aperture above the valve seat and having an air chamber therein, a valve closure in the hollow body and adapted to be seated in the valve seat and to close the drain aperture, and a plunger carried by the valve closure and adapted to enter the air chamber for cushioning the seating movement of the valve closure.

In testimony whereof I have signed my name to this specification in the presence of two subscribing witnesses.

ELMER TUELL.

Witnesses:
CURTIS MAJOR,
SIMS MAJOR.